Sept. 18, 1923.
J. TALASEK
1,468,090
SPOKE TIGHTENING WASHER
Filed Sept. 20, 1922
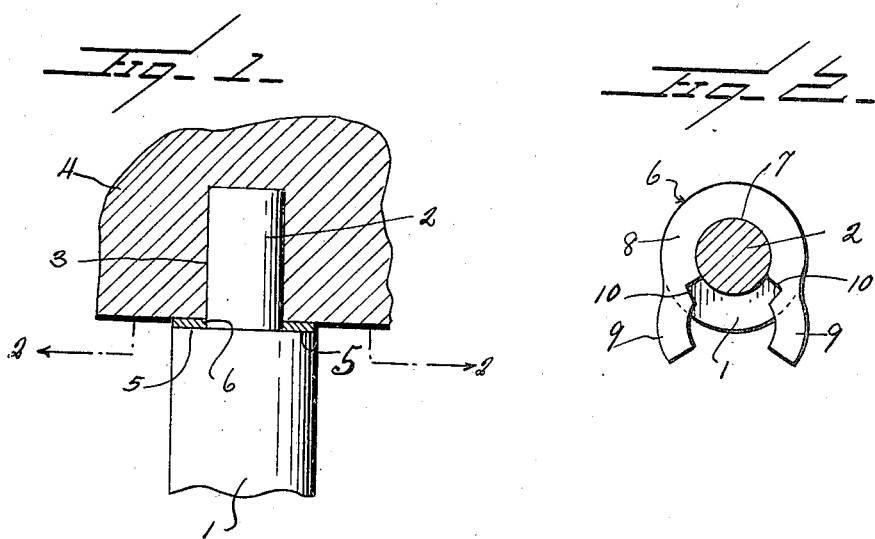
Inventor
Joseph Talasek
By Watson E. Coleman
Attorney Patented Sept. 18, 1923.

1,468,090

UNITED STATES PATENT OFFICE.

JOSEPH TALASEK, OF TEMPLE, TEXAS.

SPOKE-TIGHTENING WASHER.

Application filed September 20, 1922. Serial No. 589,409.

*To all whom it may concern:*

Be it known that I, JOSEPH TALASEK, a citizen of the United States, residing at Temple, in the county of Bell and State of Texas, have invented certain new and useful Improvements in Spoke-Tightening Washers, of which the following is a specification, reference being had to the accompanying drawings.

Parts of a wheel usually in time become loose, particularly adjacent the outer ends of the spokes where the tenon engages into the felly, and in order to tighten the spoke a washer is forced between the felly and the shoulder of the spoke and engages around the tenon, thereby filling up the space between the shoulder and felly, and hence tightening the spoke. U-shaped washers for this purpose have been extensively used, but when the wheel again becomes loose, the washer will drop from between the shoulder of the spoke and the felly.

The present invention has for its purpose the provision of a washer which, before its attachment to the spoke, is substantially U-shaped, and after being applied in position, extensions of the washer are bent or forced between the shoulder of the spoke and the felly, thereby permanently attaching the washer, and preventing it from dropping out of position, when the spokes of the wheel again loosen.

Another purpose is the provision of a washer stamped from a single piece of sheet metal of a pliable character, with opposite V-shaped notches formed in the arms of the washer in order to permit the extensions to be bent or forced between the end of the spoke and the felly.

The invention comprises further features and combination of parts, as will be hereinafter set forth, shown in drawings and claimed.

In the drawings:—

Figure 1 is a view partially in section and partially in elevation showing the tenon of a spoke engaged in the felly of a wheel with the improved washer applied.

Figure 2 is a sectional view on line 2—2 of Figure 1, showing the normal positions of the extensions before they are forced between the end of the spoke and the felly;

Figure 3 is a view similar to Figure 2 showing the extensions forced between the end of the spoke and the felly;

Figure 4 is an enlarged detail perspective view of the washer.

Referring to the drawings, 1 designates a spoke, and 2 denotes a tenon on the end of the spoke, which fits into a socket 3 in the felly 4.

In order to fill up the space between the felly and the shoulder 5 adjacent the tenon of the spoke for the purpose of tightening the spoke, a washer 6 is provided. This washer is constructed of any suitable sheet metal preferably of pliable character. The washer is substantially U-shaped, and its arcuate portion 7 engages about the tenon. The washer comprises a body 8, which is for its greater part, substantially arcuate, and the ends of the arms of this body have integral extensions 9, which are all the same general curvature as the body. However these arms are normally substantially parallel, and adjacent where the arms integrally connect with the arms of the body, the adjacent edges of the washer are provided with V-shaped notches 10.

Obviously when the washer is fitted into place with the arms of the body engaging around the greater portion of the tenon, the extensions assume substantially parallel positions, but after the washer is applied the extensions are bent or forced to engage between the shoulder of the spoke and the felly. After the extensions have been so disposed, the washer entirely encircles the tenon, at a point between the shoulder and the felly. The V-shaped notches permit the extensions to be forced into such positions, and it is to be understood that while the metal from which the washer is constructed is designed to be somewhat pliable, it has sufficient rigidity, to retain the extensions in such positions as they may be forced.

The invention having been set forth, what is claimed is:—

As a new article of manufacture, a spoke tightening washer adapted to be positioned on a spoke tenon between a shoulder on the spoke at the base of the tenon and the inner surface of a wheel felly, comprising a flat substantially U-shaped piece of rigid metal having its ends separated substantially by a distance equal to its internal diameter when the ends are closed, and embodying a rigid unbroken substantially semi-circular body, and similar arcuate rigid unbroken extensions integral with the ends of the body, said extensions being normally substantially parallel with each other, the washer being provided with opposed V-shaped notches in its inner edge at the points of connection between the ends of the body and the extensions of such size as to permit the inner edges of said extensions to contact with the spoke tenon when the extensions are closed to form a ring with the walls of the notches in contiguous relation.

In testimony whereof I hereunto affix my signature.

JOSEPH TALASEK.